Patented Dec. 21, 1943

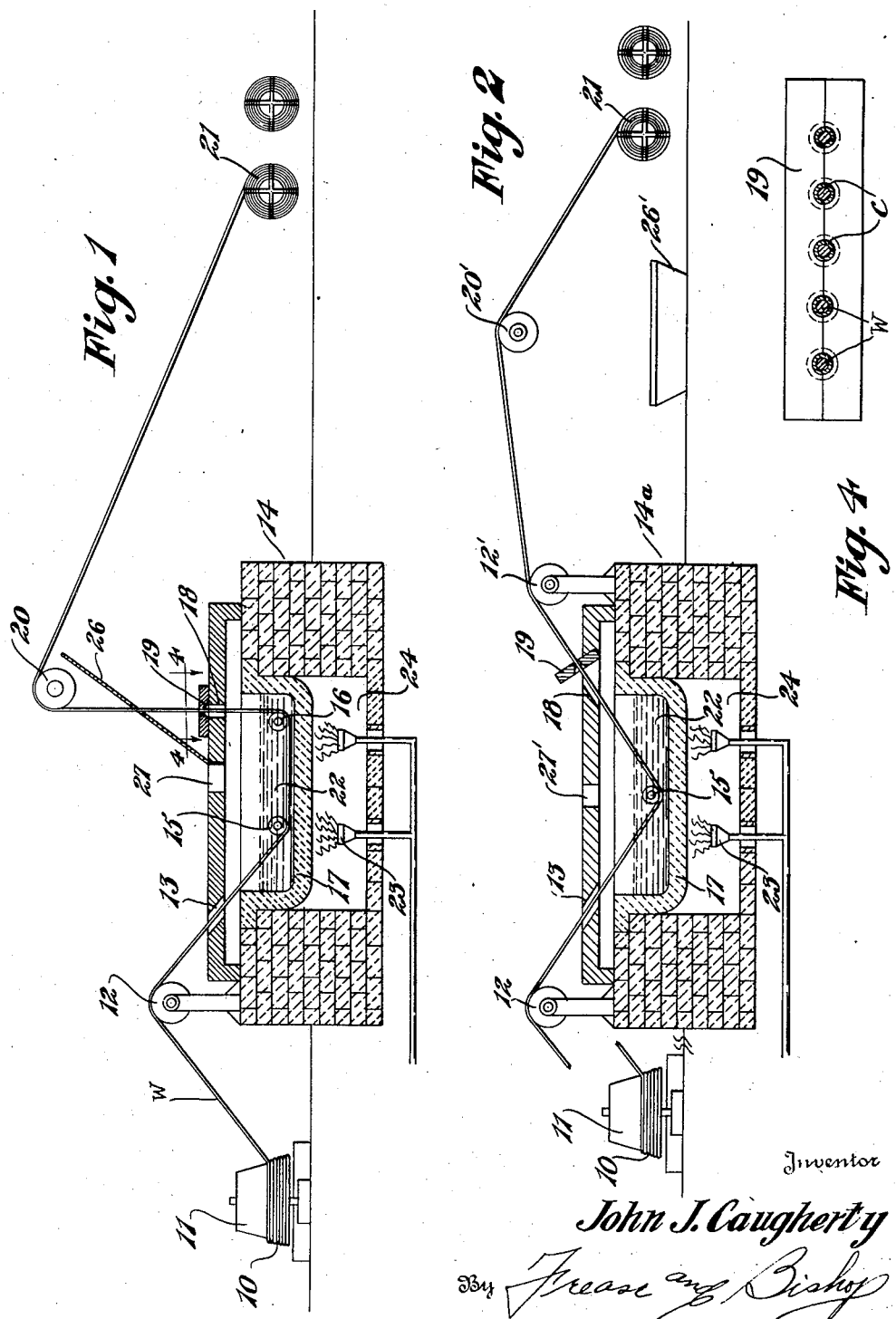

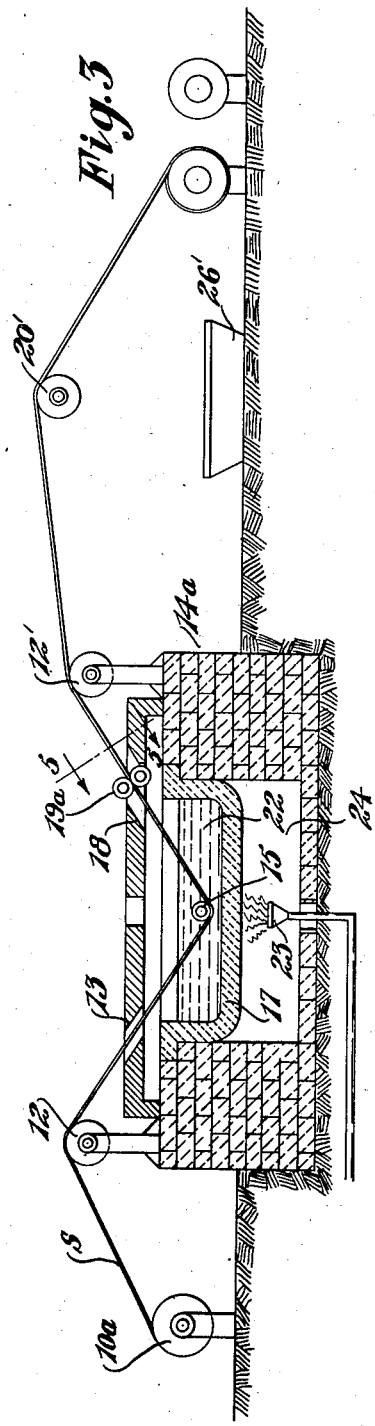
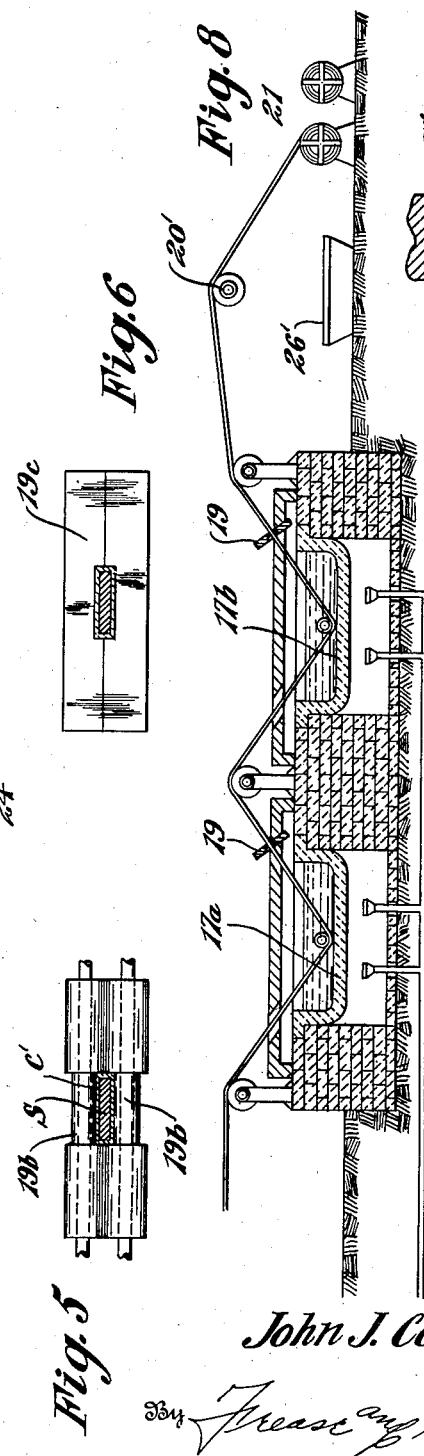
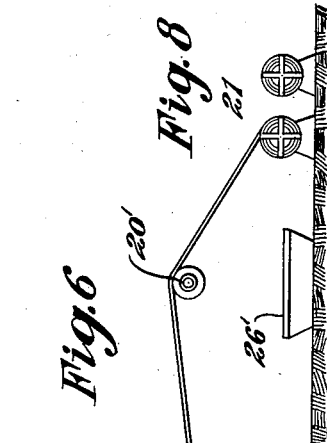
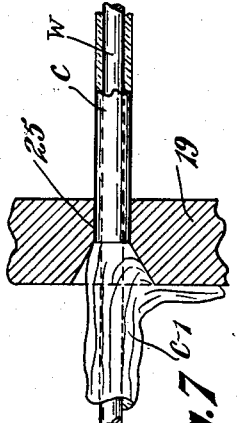

2,337,186

UNITED STATES PATENT OFFICE 2,337,186

METHOD OF TREATING FERROUS METAL ARTICLES WITH GLASS COATINGS

John J. Caugherty, Belle Vernon, Pa.

Application September 9, 1942, Serial No. 457,725

11 Claims. (Cl. 29—81)

The invention relates to the treatment of ferrous metal articles with glass coatings for removing scale and oxides therefrom, or for preventing the formation of scale and oxides thereon, or for protecting the surfaces thereof. More particularly the invention relates to the control of the character of glass coatings applied for such purposes to ferrous metal articles such as wire, rods, strip and the like.

Molten slag has been proposed for use as a coating for dissolving metal oxides, involving the use of a slag which is soluble or at least partly soluble in water to facilitate the complete removal thereof. Such treatment introduces other problems which are difficult to control from the standpoint of obtaining a uniform product in an inexpensive manner.

These difficulties have been partially avoided by utilizing a glass coating made from glass having certain characteristics, which glass coating suddenly and violently disintegrates or separates from the article coated when cooled to a temperature of approximately 400° F. However, such treatment also involves difficulties because it is sometimes undesirable to expose the article coated, at the time and temperature when the sudden and violent separation of the glass coating occurs. Moreover, it is sometimes difficult to control the uniformity of the characteristics of the article being treated when the separation of the glass is effected in this manner.

I have discovered, however, that if the thickness of the glass coating applied to the article being treated is controlled within a certain range, and that if the thickness of the glass coating is maintained substantially uniform throughout the entire surface of the article being treated, these prior art and other difficulties may be avoided, the sudden and violent separation of the glass coating from the article will be prevented, and the treated article will have extremely uniform and excellent characteristics.

Accordingly, it is an object of the present invention to provide a method for removing scale and oxides from steel products such as wire, rods, strip and the like by applying a molten glass coating thereto and by controlling the character of the glass coating to produce a uniform treated product.

Furthermore, it is an object of the present invention to provide a method for preventing scale and oxides from forming on steel products while being heat treated by utilizing a controlled glass coating to produce a uniform heat treated product.

Likewise, it is an object of the present invention to protect special surfaces developed on steel articles while they are being heat treated, by utilizing a glass coating and controlling the character of the glass coating for producing a uniform product.

Also, it is an object of the present invention to eliminate the requirement of pickling, and to eliminate the use and cost of acid for pickling, in the manufacture of cold rolled or cold drawn steel products having uniform characteristics and properties.

It is a further object of the present invention to eliminate metal loss by oxidation, to reduce the cost, to increase the production, and to improve the quality and finish of cold rolled or cold drawn steel products by utilizing a glass coating treatment and controlling the coating to produce a uniform product.

These and other objects and advantages may be obtained, the foregoing difficulties may be eliminated, and beneficial results may be achieved by the present invention, which is hereinafter described in detail, preferred examples of which are shown diagrammatically in the drawings, and which is hereinafter set forth in the claims; and which may be stated in general terms as including in the treatment of steel products such as wire, rods, strip and like articles, the steps of passing the articles through a bath of molten glass to coat the same with an adherent coating of glass, controlling the thickness of the glass coating so that it completely covers the metal surface of the article and is not more than about $\tfrac{1}{32}$ of an inch in thickness, at the same time controlling the glass coating so that it is uniform throughout the surface of the metal coated, then cooling the glass coated article, and then completely removing the glass coating when desired by slightly deforming the coated article to crack and break the glass coating and separate it from the article.

In the drawings,

Figure 1 illustrates diagrammatically one arrangement for carrying out the improved glass coating treatment in connection with the manufacture of wire products;

Fig. 2 illustrates diagrammatically a slightly modified arrangement of treating wire products;

Fig. 3 illustrates diagrammatically an arrangement for treating strip products in accordance with the present invention;

Fig. 4 is a view of the coating thickness control dies used in Fig. 1, looking in the direction of the arrows 4—4, Fig. 1;

Fig. 5 is a view of coating thickness control rolls, looking in the direction of the arrows 5—5, Fig. 3;

Fig. 6 is a view of a modified form of coating thickness control dies for use in connection with strip products;

Fig. 7 is an enlarged view illustrating diagrammatically the operation of the dies to provide a uniform controlled thickness glass coating; and Fig. 8 is a view similar to Fig. 2, illustrating diagrammatically a modified treatment arrangement.

Similar numerals refer to similar parts throughout the drawings.

A number of examples are hereinafter set forth of the use of the invention in connection with the manufacture of wire, rods, strips and the like.

Referring first to Fig. 1, a coil 10 of hard, bright, drawn, low carbon steel wire W is located on reel 11 and the wire is passed over guide roll 12 through opening 13 in the roof of glass heating furnace generally indicated at 14, under submerged rolls 15 and 16 in pot 17, then out through roof opening 18, die 19 and deforming roll 20 to coiler 21.

A bath 22 of molten glass is maintained in pot 17 produced by melting a frit, preferably containing silica with soda and lime or other similar materials to form an alkaline glass; and the bath is maintained molten at the desired temperature, preferably by burners 23 in the heating chamber 24 of furnace 14 below pot 17.

For dead soft annealing of the wire W, the molten glass is maintained at a temperature of approximately 2300° F., and for medium annealing of the wire W, the molten glass is maintained at a temperature of approximately 1800° F. The speed of the wire in passing through the molten glass bath 22 is controlled so that the wire is immersed in the bath from say 5 to 30 seconds, depending upon the size of the wire and the temperature of the bath.

In passing through the glass bath 22, a coating of molten glass adheres to the surface of the wire, but this coating is non-uniform in character and may be relatively thick.

In accordance with the present invention, the wire then passes immediately through the die 19, well illustrated in Figs. 4 and 7. The die 19 is provided with die openings 25 of such size and shape that the resulting thickness of the glass coating C on wire W is not more than $\frac{1}{32}$ of an inch in thickness, and is uniform throughout.

I have discovered that in leaving the molten glass bath the product coated with the molten glass must be passed through openings or between rolls, or dies or wipers to provide a uniform thickness of glass, and that the thickness of the glass must be controlled in order to obtain proper and uniform heat treatment of the article, and proper protection from oxidation, or separation of oxides on the surface if any are present.

The resulting glass coating C, upon leaving die 19, should be as thin as possible so long as a uniform coating is maintained and so long as the metal is completely covered, in order to obtain the best results. In any event, the glass coating C should not be more than $\frac{1}{32}$ of an inch in thickness, because a greater thickness may heat or maintain the material heated too long before the glass cools. Moreover, a greater thickness of glass does not contribute any to the oxide separation or oxidation prevention functions of the glass; and a greater thickness uses too much glass, and therefore fuel for heating the glass, and involves additional unnecessary expense.

The glass thickness is maintained within the stated limits by using suitable sizes of dies, rolls or wipers, irrespective of the size or diameter of the wire W. In the example being described, the immersion of the wire in the molten bath 22, and the glass coating C thereon after leaving the bath, prevents any oxidation of the wire surfaces while the heat treatment is being carried out. In Fig. 7, the non-uniform and thick molten glass coating adhering to the wire W as it leaves the bath 22, is indicated at C—1 prior to passing through die opening 25.

The roll 20 is spaced the necessary distance from the die 19 so that the wire is cooled to the proper degree before separating the glass therefrom; and the separation occurs in passing over roll 20 by deforming or distorting the glass coated wire as it passes over the roll, which breaks or cracks the glass. The glass separates from and falls from the wire, dropping on chute 26, which directs the broken glass pieces back through roof opening 27 into the molten glass bath.

The heat treating cycle, which may be either annealing, normalizing or "patenting" is controlled by the time of immersion of the wire in the molten glass, and therefore by the distance between rolls 15 and 16, and the speed at which the wire W is passed through bath 22, by the temperature of the molten glass, and by the time of cooling. The temperature of the molten glass may be anywhere between 1800° F. and 2400° F., the higher the temperature, the better. The molten glass is more fluid at higher temperatures. The material may be passed faster and the wiper die 19 functions better to provide the desired uniform thickness of the coating C when the molten glass is more fluid and when the speed of the wire passing through the die is fast.

Heretofore, when I have coated wire with molten glass and when the thickness and uniformity of the glass coating C was not controlled, the glass coating upon cooling to about 400° F., would suddenly and violently separate or pop off. In many instances this is undesirable. By controlling the thickness and uniformity of the coating C, the glass coating can be cooled, even to room temperature if desired, and it will still adhere to the metal surface, although ordinarily it will not be cooled to this extent before passing over roll 20. However, a slight deformation or bending of the glass coated wire when cool will break the glass coating, and separate it from the wire as indicated. Normally the cooling operation is carried out in the air, although if necessary for a selected heat treatment cycle for certain grades of steel, the glass coated material can be cooled or quenched in hot water.

After leaving roll 20, the wire is bright and clean and may be passed through oil for oiling the surface, if desired, or a quick drying clear coating for protection may be applied before being wound on reels 21. Thereafter, the wire on reels 21 may be given a light draft to size and finish specified if desired.

Referring to Fig. 2, a modified arrangement of the apparatus is shown diagrammatically, similar to that shown in Fig. 1, except that die 19 of furnace 14a is angled; guide roll 12' is provided; and roll 20' is located at some distance from furnace 14a. Roll 20' distorts or bends the glass coated wire so that the glass coating separates therefrom and drops to receiver 26'. The broken glass in receiver 26' may be dumped back into the glass bath through opening 27'.

Referring to Fig. 3, a modified arrangement is illustrated for use in the treatment of strip products and the like. The arrangement is similar to that shown in Fig. 2, except that a reel 10a is provided for strip S, and roller wipers 19a are preferably provided to control the thickness and uniformity of the glass coating C' applied to the strip product (Fig. 5). The rolls 19a are preferably grooved at 19b so that the glass coating will be as thin as possible, completely covering the surface of the strip but not over 1/32 of an inch thick. An alternate form of strip die wipe 19c is illustrated in Fig. 6.

It is to be understood in connection with the foregoing description that if the material in coils 10 or 10a has oxides or scale thereon, the glass coating carries the oxides or scale with it upon separation of the glass coating from the material, leaving the material clean.

High carbon steel wire may be similarly treated with some modifications, as illustrated somewhat diagrammatically in Fig. 8. In the heat treatment of such wire, the wire is first passed through a furnace heated to approximately 1500° F. for the required time, and is then passed from the furnace through two glass pots 17a and 17b, both equipped with wiper dies 19. Some oxide of course is formed by the initial furnace heating, and this oxide on high carbon, high silicon steel wire or rods seems to dissolve or go into solution in the glass.

Molten glass with oxides in solution does not always uniformly cover or adhere to the metal, so that there may be some bare spots, even after passing through pot 17a. However, by again passing the wire W through glass pot 17b and wiper 19, the dissolved oxides or oxides in solution in the first glass coating do not become absorbed in the second glass coating, so that a uniform thin glass coating results as the wire emerges from the wiper dies 19 of pot 17b.

Ordinarily, with this type of material, after passing over glass separating roll 20', the wire may be passed through a lime bath before being wound on take-up reel 21, for preparation for subsequent drawing operations. Ordinarily, the total time of immersion of the wire in glass baths 17a and 17b may be from 10 to 30 seconds, and the resulting wire is of "patented" structure.

It is noted that in Fig. 8, the double glass bath is shown as a separate unit from the initial heating furnace (not shown), but it is to be understood that the two pots 17a and 17b might be located at the exit end of a heating furnace so that the wire passes through the molten glass baths upon emerging from the furnace.

I have also found that the treatment described, with the control of the thickness and uniformity of the glass coating, may be substituted for annealing and pickling wire prior to galvanizing. That is to say, the product may be passed from glass separating roll 20 or 20' to a flux bath, then into a spelter bath, wiping dies and ultimately to reels, for galvanizing the material treated in the glass furnace.

The improved treatment may also be used in connection with the manufacture of stainless steel wire. Thus, hard, bright, drawn stainless steel wire may be passed through the molten glass bath 22 of Fig. 1, with the glass heated to a temperature of approximately 2000° F., and with an immersion of the wire in the glass of 5 seconds to up to a minute, depending upon the diameter of the wire. An excellent structure is formed in the steel treated in this way, and after passing through die 19 and over separating roll 20, the wire may be limed or lead coated before being wound on take-up rolls in preparation for further drawing.

In event the stainless steel wire has a large diameter, after forming the glass coating thereon, it may be passed through a short furnace to perform the necessary heat treatment and to carry out the time cycle thereof for the particular analysis of stainless steel being treated. In this manner, the heat treatment is performed on a glass coated wire, and no scale or oxides can form thereon.

The same treatment described for low carbon steel wire may be used for descaling low carbon steel rods, which may have a heavy scale thereon, which is very brittle and loose. In passing the material through the molten glass bath and glass coating control dies, and then removing the scale, a perfectly cleaned white steel surface results after the glass separates.

A treatment for high carbon steel rods may be used similar to that for high carbon steel wire. The scale on this material is very tight and goes into solution and is absorbed by the glass. If the glass coating is not uniform in passing through one molten glass bath, the material may be passed through a second glass bath to obtain a uniform coating.

In the specification, certain terms are used for brevity and not for the purposes of limitation. For instance, the invention contemplates the treatment of wire, rods, strip and like steel products, and such products may be either low carbon steel, or high carbon steel, or stainless steel of either the straight chrome or nickel chrome type.

Moreover, such products being treated may have a special finish; or may have a coating finish thereon such as a copper coating. Accordingly, the term "wire and the like" as used herein and in the claims is intended to include products of the character described.

Also, die means of various types have been described for controlling the thickness and uniformity of thickness of the glass coating applied, and it is to be understood that ultimately such die means operate to wipe off excess molten glass and provide a uniform and controlled thickness of coating.

In the drawings and description, rolls have been shown over which the glass coated products pass for separating the glass from the products by distorting, bending or curving the wire about the roll to crack and break the glass. It is to be understood, however, that any suitable means of flexing the wire for cracking and breaking the glass and separating the glass from the wire is contemplated.

Accordingly, the present invention provides a simple, efficient and readily controlled method for removing scale and oxides from steel products, or for preventing scale and oxides from forming during heat treatment of the steel products, or for producing surface finishes, coatings, etc., on steel products as they are being heat treated.

Furthermore, the invention eliminates pickling requirements, acid costs and metal loss in connection with the processing of steel products and enables increased production, an improved quality and finish, and reduced costs to be obtained. Finally, by the control of the uniformity and thickness of the glass coating and the removal thereof when desired, the above results are achieved and a uniform product is obtained.

Having now described the features of the invention, the difficulties overcome, the method to be practiced, and several examples of the treatment of wire, rods, strip and the like utilized in accordance with the present invention; the new and useful methods, steps, procedures and arrangements constituting the present invention, and reasonable mechanical equivalents thereof, are set forth in the appended claims.

I claim:

1. In a method of producing a clean, oxide-free surface on wire and the like, the steps of passing a wire through a bath of molten glass to apply a coating of molten glass thereto, controlling the thickness and uniformity of thickness of said coating, cooling the glass coated wire, and then separating the glass from the wire by flexing the wire.

2. In a method of producing a clean, oxide-free surface on wire and the like, the steps of applying a coating of molten glass to a wire and controlling the thickness and uniformity of thickness of said coating, cooling the glass coated wire, and separating the glass from the wire.

3. In a method of producing a clean, oxide-free surface on wire and the like, the steps of passing the wire through a bath of molten glass to apply a coating of molten glass thereto, then passing the molten glass coated strip through die means to wipe off excess glass and provide a uniform thickness of glass thereon of up to $\frac{1}{32}$ of an inch thick, then cooling the glass coated wire, and then separating the glass from the wire by flexing the wire.

4. In a method of producing a clean, oxide-free surface on wire and the like, the steps of applying a coating of molten glass to a wire, wiping excess molten glass off of the glass coated wire to provide a uniform thickness of glass thereon of up to $\frac{1}{32}$ of an inch thick, cooling the glass coated wire, and then separating the glass from the wire.

5. In a method of heat treating and forming a clean, oxide-free surface on wire and the like, the steps of applying a coating of molten glass to a wire, maintaining the molten glass at the proper temperature and maintaining the wire in contact with the molten glass at such temperature for a sufficient time to carry out the desired heat treatment, controlling the thickness and uniformity of thickness of the glass coating, cooling the glass coated wire, and separating the glass from the wire.

6. In a method of heat treating and forming a clean, oxide-free surface on wire and the like, the steps of coating a wire from molten glass by passing the wire through a bath of molten glass maintained at the proper temperature for carrying out the desired heat treatment, maintaining the wire in the molten glass for a sufficient time to carry out the desired heat treatment, controlling the thickness and uniformity of thickness of the glass coating after the glass coated wire emerges from the bath, cooling the glass coated wire, and separating the glass from the wire by flexing the wire.

7. In a method of heat treating and forming a clean, oxide-free surface on wire and the like, the steps of passing a wire through a bath of molten glass maintained at from 1800° F. to 2400° F. to heat treat the wire and apply a coating of molten glass thereto, controlling the thickness and uniformity of thickness of said coating, cooling the glass coated wire, and then separating the glass from the wire by flexing the wire.

8. In a method of heat treating and forming a clean, oxide-free surface on wire and the like, the steps of passing the wire through a bath of molten glass maintained at from 1800° F. to 2400° F. to heat treat the wire and apply a coating of molten glass thereto, wiping the molten glass coating after the glass coated wire emerges from the bath to provide a uniform thickness of coating of up to $\frac{1}{32}$ of an inch thick, cooling the glass coated wire, and separating the glass from the wire.

9. In a method of heat treating and forming a clean oxide-free surface on wire and the like, the steps of heating a wire, then passing the wire through a bath of molten glass to apply a coating of molten glass to the heated wire, controlling the thickness and uniformity of thickness of said coating, cooling the glass coated wire, and separating the glass from the wire.

10. In a method of heat treating and forming a clean, oxide-free surface on wire and the like, the steps of applying a coating of molten glass to a wire, controlling the thickness and uniformity of thickness of said coating, maintaining the uniformly glass coated wire at a proper temperature and for a sufficient time to carry out a desired heat treatment, cooling the glass coated wire, and separating the glass from the wire.

11. In a method of producing a clean, oxide-free surface on wire and the like, the steps of passing a wire through a bath of molten glass to apply a coating of molten glass thereto, controlling the thickness and uniformity of thickness of said coating, passing the glass coated wire through a second bath of molten glass to apply an additional coating of molten glass thereto, controlling the thickness and uniformity of thickness of said second glass coating, cooling the glass coated wire, and then separating the glass from the wire.

JOHN J. CAUGHERTY.